[11] 3,632,871

[72] Inventors Robert A.
Santa Barbara, Calif.;
Richard F. Schuma, Lynnfield, Mass.
[21] Appl. No. 819,283
[22] Filed Apr. 25, 1969
[45] Patented Jan. 4, 1972
[73] Assignee Raytheon Company
Lexington, Mass.

[54] OPTICAL SCANNING DEVICE
18 Claims, 8 Drawing Figs.
[52] U.S. Cl. .................................................. 178/7.6,
178/DIG. 27, 350/7, 350/285
[51] Int. Cl. ........................................................ H04n 1/04
[50] Field of Search ............................................ 178/7.6, 7.1
E; 350/6, 7, 285

[56] References Cited
UNITED STATES PATENTS
3,345,460 10/1967 Betts .............................. 178/7.6

................... 178/7.6
FOREIGN PATENTS
21,696 9/1930 Australia ..................... 178/7.6

*Primary Examiner*—Robert L. Griffin
*Assistant Examiner*—Joseph A. Orsino, Jr.
*Attorneys*—Harold A. Murphy, Herbert W. Arnold and Joseph D. Pannone

ABSTRACT: An optical scanning system embodying a rotatable drum having a series of mirrors arranged along its inner surface, a focusing lens system for directing an image onto an angled mirror located within the drum and on the axis of the system, the angled mirror directing the image onto the series of mirrors on the drum, the mirrors in the series being tilted at successively greater angles whereby as the drum rotates each mirror will effectively perform a line scan of said image directing the radiation from successive points along said scan toward a rotating mirror mounted on a galvanometer adjacent the axis of the rotating drum, the rotating mirror directing said scan to a remote detector.

INVENTORS
ROBERT A. WATKINS
RICHARD F. SCHUMA
BY Herbert W. Arnold
ATTORNEY

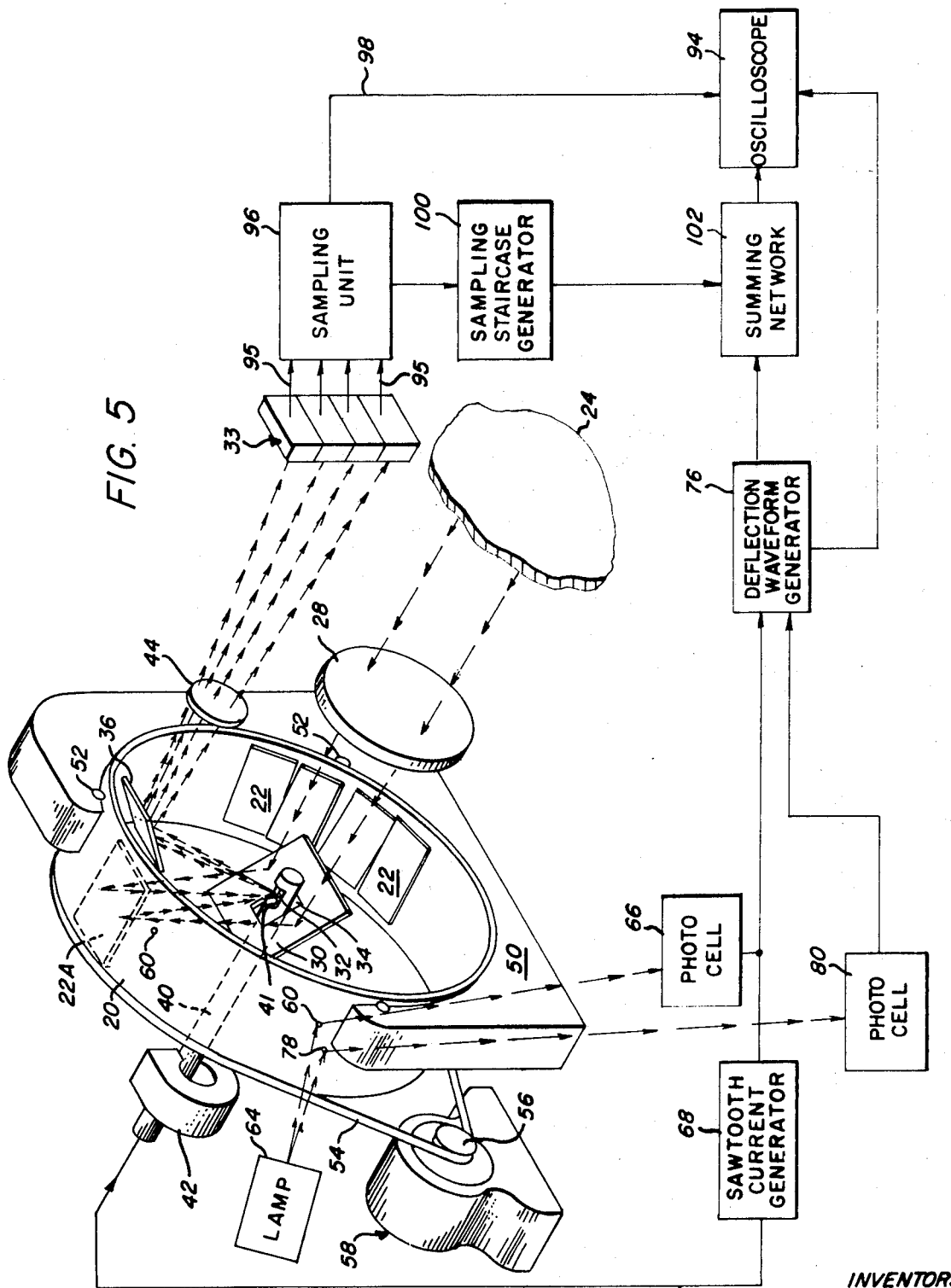

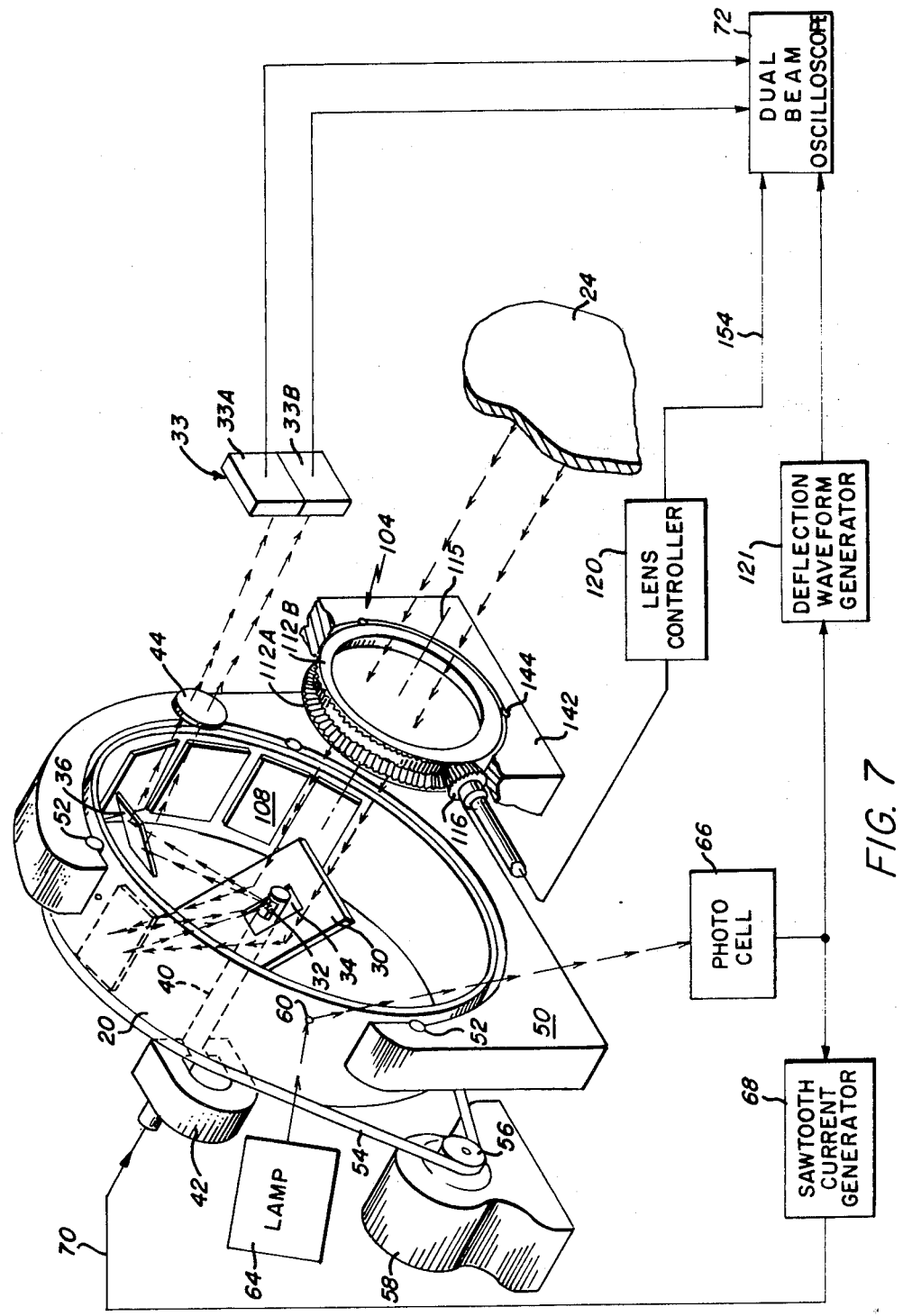

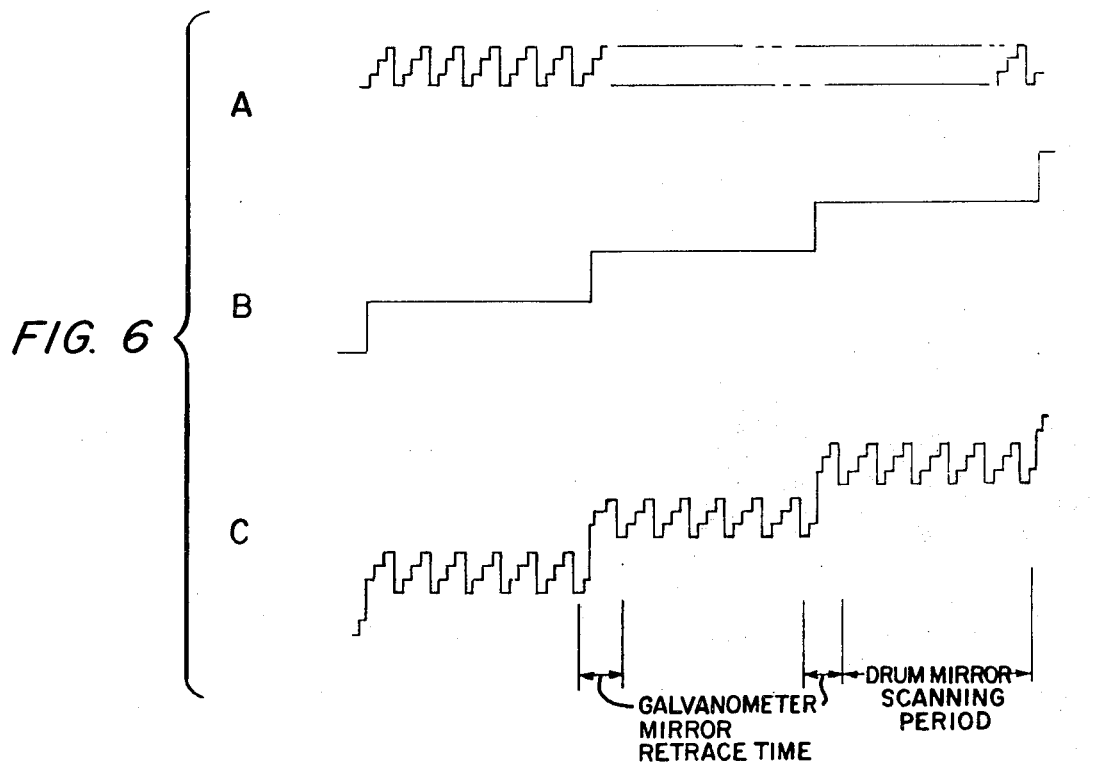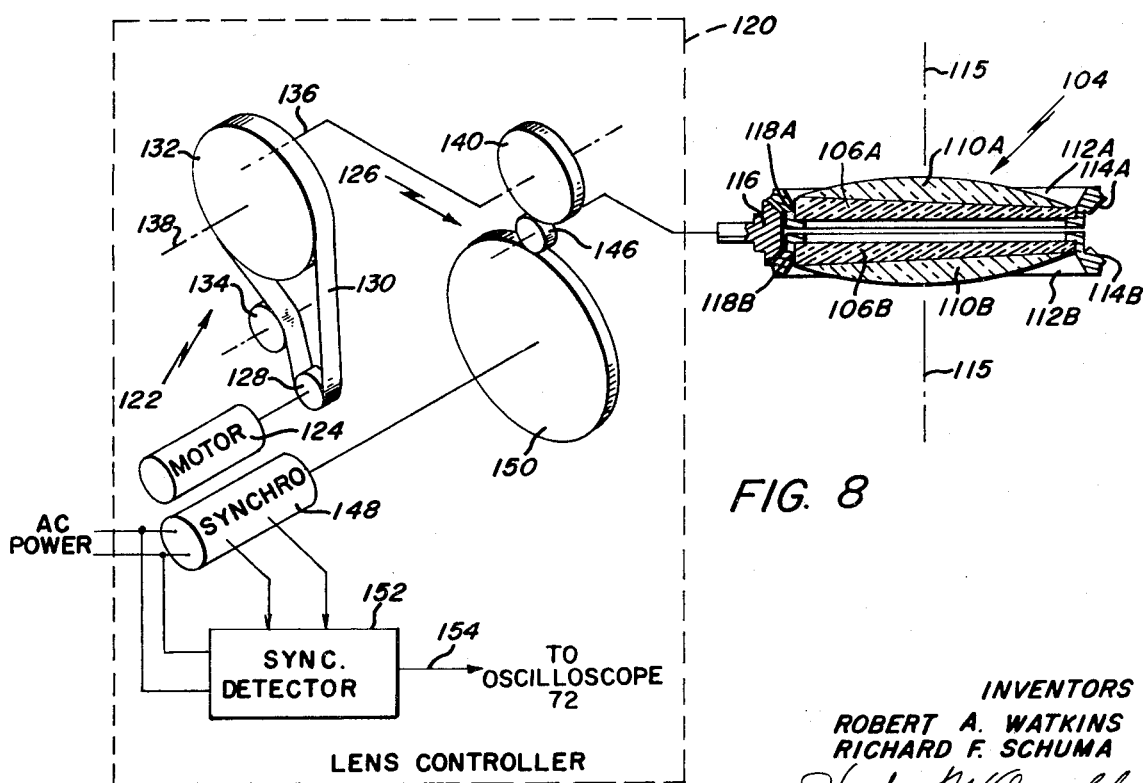

OPTICAL SCANNING DEVICE

BACKGROUND OF THE INVENTION

This invention relates to optical scanning systems and more particularly to a drum scanner adapted to produce a raster scan.

Optical scanners are used to synthesize a picture of an object by observing sequentially various portions of the object. The radiation from these various portions is processed and used to drive display elements properly positioned to provide the complete picture. Typically, each portion is in the form of a strip extending across the picture. The strip can be scanned by a light-sensitive detector with an optical aid, such as a moving mirror, which permits the detector to be stationary. The detector senses the intensity of the light as the strip is scanned to provide a record known as a line scan. Each strip or line is scanned sequentially in a format known as a raster scan. The quality of the synthesized picture depends on the purity of the signal received by the detector, the linearity of the scan, as well as on the number of scanning lines in the raster.

The development of a raster scan with a display device having fewer elements than the number of horizontal lines reproduced requires both horizontal and vertical scanning. Accordingly, the typical scanning system develops a plurality of horizontal scans and shifts the scanning beam vertically between each of the horizontal scans. A typical well-known scanning drum carries mirrors which sequentially intercept an image-forming beam and provides only horizontal scanning so that an auxiliary scanning device is required to produce the vertical shifts between the horizontal line scans. It is desirable, therefore, to provide a scanning device which produces both the horizontal and vertical components of a raster scan by means of a single-mechanical motion in one direction.

Also, a major factor influencing the purity of the signal at the output of the scanning device is the detector-receiving optics. For example, if the detector has a field of view wider than that subtended by the imaging optics, the detector senses the background radiation in addition to the signal beam of light. On the other hand, a scanning system which provides a matched field of view to the detector as limited by the imaging optics enhances the signal purity by eliminating a large portion of the photon noise generated by the background radiation. Furthermore, the matched field of view permits the use of a large relative aperture for the detector which increases the intensity of the optical signal presented to the detector and thereby provides a corresponding reduction in the effect of any noise produced within the detector itself.

However, a wide field of view is usually required for detectors used with such scanning devices. These scanning devices typically provide an optical system wherein the image transmitted to the detector is not stationary, as for example where the image is reflected from a mirror affixed to a rotatable drum wherein the point of reflection changes as the drum rotates. Accordingly, the detector must have a sufficiently wide field of view to receive the optical signal in which the point of reflection moves about its mean position. Therefore, the desirable narrow field of view is not available for detectors in the typical optical scanner.

The aforementioned movement of the point of reflection in a simple drum scanner also introduces a defocusing effect. The defocusing generally results from the radial motion of the drum mirrors, with respect to the scanned planar image. Furthermore, with the typical scanner of the prior art, less than half of the time is used in collecting scene radiation. This reduces signal purity. In certain situations, such as where a moving object is to be scanned, rapid scanning can be obtained by compromising picture quality for scanning speed, that is, the raster scans are produced at a higher rate, which further reduces signal purity or fewer line scans are produced per raster resulting in a coarse rather than a fine-line picture. It would be desirable, therefore, to increase the number of line scans for a given rate of drum rotation and to make full use of the available time in any line scan to improve the signal purity.

An object of the present invention is to provide an improved drum scanning device in which a single rotation of the drum produces both the horizontal and vertical components of a raster scan, and thereby eliminates the need for an auxiliary device to produce the vertical shifts between the horizontal line scans.

A further object of the present invention is to provide an optical scanning device in which the detector is provided with an optical system having a field of view which is better matched to the cone of radiation from the image-forming optics to enhance the signal purity.

SUMMARY OF THE INVENTION

An optical scanning system comprising a rotatable drum having a series of independent reflecting means located around its circumference, focusing means such as a lens system for directing image-forming rays of radiation onto said reflecting means from a stationary point substantially equidistant from each of said reflecting means, each of said reflecting means being tilted at successively different angles with respect to the axis of said drum whereby as the drum rotates each of said reflecting means performs a separate line scan, a rotatable means including radiation detecting means positioned to receive image-forming rays of radiation which are reflected from said independent reflecting means, and means for synchronizing the rotation of said rotatable means including radiation receiving means with the rotation of the independent reflecting means through an angle sufficient to permit detection of radiation of an individual line scan.

In alternate embodiments of the invention, separate line scans are formed by means of successively different prismatic reflectors located around the circumference of the rotating drum, and also by means of prisms rotatably mounted between elements of the focusing lens.

BRIEF DESCRIPTION OF THE DRAWINGS

The aforementioned objects and other features of the invention are explained in the following description taken in connection with the accompanying drawings wherein:

FIG. 5 is an isometric view of an alternative embodiment of the invention in which a multiplicity of radiation detectors are utilized in conjunction with sampling circuitry to provide a visible display of the scanned image;

FIG. 6 shows waveforms of the vertical deflection signal utilized in an oscilloscope display of the embodiment shown in FIG. 5;

FIG. 7 is an isometric view partly in block diagram form of an alternate embodiment of the invention in which the primary focusing lens combines prismatic elements which are rotatably mounted to provide the vertical portion of the scanning raster; and FIG. 8 is a detailed view of the rotatable prismatic focusing lens, including a drive mechanism in diagrammatic form.

DESCRIPTION OF THE PREFERRED EMBODIMENT

Figure 1:
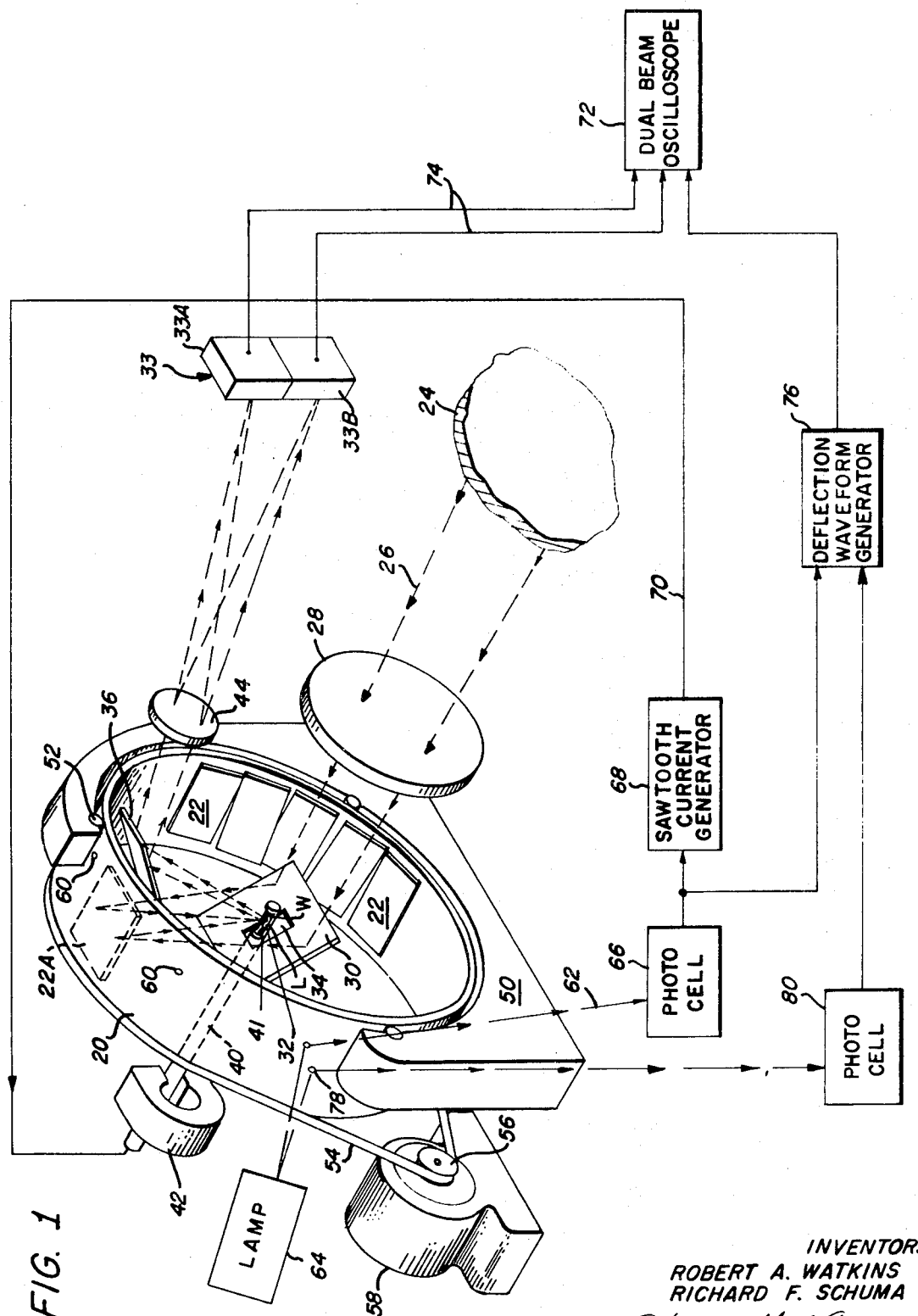
FIG. 1 is an isometric view partly in block diagram form of the optical system of this invention.
Figure 2:
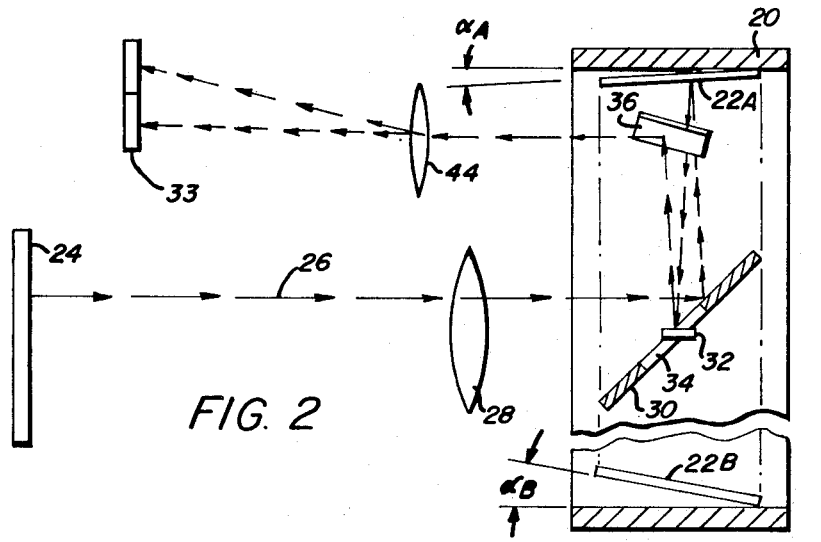
FIG. 2 is a sectional view of a scanning drum of the optical system taken along the axis of the scanning drum of FIG. 1.

In FIGS. 1 and 2 there is shown an embodiment of the present invention in which a rotating scanning drum 20 having a series of mirrors 22 which are mounted on its inner surface and which are tilted in a novel manner with respect to the drum axis performs sequential line scans corresponding to the lines of a raster scan by dissecting an image of a scene, in particular object 24, to be scanned. The image of object 24 is formed from radiation emitted by object 24, such as visible or infrared radiation indicated diagrammatically by arrows 26, which passes through an image-forming converging lens 28 and is then incident upon a stationary inclined mirror 30 located at the center of the scanning drum 20. The inclined mirror 30 reflects the image-forming rays of radiation radially outward so that these rays are intercepted by the rotating drum mirrors 22. Each of the drum mirrors 22 successively passes through the image-forming rays of radiation and dissects the image by directing the radiation from a particular point in the scene back to galvanometer mirror 32 and ultimately to radiation detector elements 33. Thereby the image is dissected into a well-known raster scan format having typically a set of horizontal line scans which are vertically spaced from each other in accordance with the angles of tilt of the individual drum mirrors 22. The number of horizontal line scans generated with each detector element in this embodiment of the invention is equal to the number of drum mirrors. Thus, the scanning drum with its tilted mirrors provides both horizontal and vertical scan with a single-mechanical motion.

To extract the scanned image, a rotatable galvanometer mirror 32 is mounted within a central aperture 34 of the inclined mirror 30 and on the axis of the scanning drum 20 to receive sequentially from each of the tilted drum mirrors 22 the reflections of the scanned image which come to a focus on the galvanometer mirror 32. Lens 28 provides a spherical image surface having a radius, or back focus, approximately equal to the diameter of drum 20 thereby allowing the rotating drum mirrors to remain equally spaced from the image surface, so that the galvanometer mirror 32 remains on the focal surface as reflected by the various drum mirrors 22, so that each portion of the scanned image is clearly formed on the galvanometer mirror 32. Accordingly, the lens 28 is placed a shirt distance, on the order of one diameter of lens 28, in front of inclined mirror 30 to provide the desired relationship between the back focus of lens 28 and the radius of drum 20. The galvanometer mirror 32 rotates in a cyclical fashion which is synchronized in a manner to be described with the rotation of each of the drum mirrors 22 such that the galvanometer mirror 32 rotates in the same direction as the scanning drum 20 and at one-half its rotation rate during the period of scanning by a particular drum mirror, such as the drum mirror 22A. At the conclusion of this period, the galvanometer mirror 32 rotates rapidly in the reverse direction to bring itself into position to reflect light from the next drum mirror 22. Thereby the rotation of the galvanometer mirror 32 compensates for the motion of the cone of radiation incident upon the galvanometer mirror 32 so that the images which focus on the galvanometer mirror 32 are reflected in a cone of radiation having a substantially fixed direction to a stationary relay system such as mirror 36, lens 44, and detector 33 for subsequent detection and display. The relay mirror 36 is conveniently mounted within the scanning drum 20 to one side of the cone of radiation from drum mirror 22, and, accordingly, the galvanometer 40 is positioned at an angle so that radiation from each of the drum mirrors 22 is reflected to the relay mirror 36. The galvanometer mirror 32 has a length indicated by L and width indicated by W in FIG. 1 adequate to contain the images of the elements of the object 24 that are instantaneously being viewed. The size of these instantaneous image elements is set by the size of a detector element 33 as imaged by relay lens 44 on the galvanometer mirror 32. The optical characteristics of relay lens 44 establishes the cone within which radiation must pass in order to reach detectors 33. Galvanometer mirror 32 redirects the diverging cone from the appropriate scanning mirror 22 to this lens 44. The cones of radiation from the adjacent scanning mirrors are reflected from galvanometer mirror 32 in directions away from relay mirror 36 and lens 44. Thus only a single-drum mirror 22 is in a position to direct radiation to the detector at any one time.

A plurality of radiation detectors 33, two of which are designated 33A and 33B, are vertically displaced from each other with reference to the horizontal line scans and are located at a place of convenience away from the scanning drum 20 to subdivide each scanned portion into a set of fine-line scans. To transfer the line scans to these detectors 33, the cone of radiation incident upon relay mirror 36 is reflected by the relay mirror 36 to relay focusing lens 44. Lens 44 focuses the radiation to form a second image of object 24 upon radiation detectors 33A and 33B. Due to the substantially fixed direction of the radiation incident upon the relay lens 44, the design of the relay lens 44 and mirror 36 is simplified in that the cone within which the radiation lies at various times during the scanning process is essentially a cone from a fixed, nearly axial point. Thus, the relative aperture of the optical system comprising the relay lens 44 and mirror 36 can be increased beyond that of a lens and mirror system utilized for a nonstationary cone of radiation, thereby increasing the intensity of the second image and providing a simplified optical design for a given quality of the second image. That is, the beams of radiation reaching detectors 33 are also substantially stationary which permits the use of the radiation detector 33 sensitive to the desired radiation and having a narrower receiving angle than for example, that of another detector utilized for a nonstationary beam of radiation, thereby improving the detectivity of the radiation by virtue of a reduction in the background photon noise.

The scanning drum 20 is rotatably supported within a rigid metallic housing 50 having three rollers 52 which are covered with a shock-absorbing material for reducing vibrations, such as rubber, not shown, and which are disposed in equally spaced relationship around the periphery of the scanning drum 20 to support the drum 20 during rotation. The scanning drum 20 has a slight circumferential depression, not shown, along its outer surface to accommodate the rollers 52 and thereby guide the drum 20. Rotation is imparted to the drum 20 through a belt 54 in frictional contact with the drum 20 and with motor pulley 56 on drive motor 58.

The rotation of the galvanometer mirror 32 is synchronized to the rotation of the scanning drum 20 by means of a plurality of reflectors 60, each of which is mounted on the outer surface of the scanning drum 20 respectively with a preset circumferential distance from its corresponding drum mirror 22 so that the rotation of the drum 20 progressively positions each of the reflectors 60 to momentarily reflect a beam of light 62 from lamp 64 to scan line photocell 66. Photocell 66 is responsive to the succession of light pulses from the reflectors 60 and generates a corresponding succession of output electrical pulses which trigger sawtooth current generator 68 to generate an electrical current having a generally sawtooth waveform which is transmitted along conductors, indicated diagrammatically by line 70 to the drive coil, not shown, of galvanometer 40 and causes the mirror 32 to rotate in the aforementioned cyclical fashion. The sawtooth waveform is composed of a succession of ramp waveforms, each of which is synchronized to a corresponding triggering pulse from the photocell 66, and, therefore, the rotations of the galvanometer mirror 32 occur in synchronism with the succession of light pulses from the reflectors 60. The sawtooth current generator 68 is also equipped with a variable delay adjustment, not shown, utilizing well-known electrical circuitry to initiate each ramp waveform at the appropriate time relative to the triggering pulses from photocell 66, and a current amplitude control, not shown, to adjust in a well-known manner the sawtooth current amplitude to provide the required angular rotation of the galvanometer mirror 32.

The galvanometer 40 is of a well-known tubular form which typically comprises a rotatable coil of conductive material, not shown, mounted on a torsion support 41, directly connected to the mirror 32, and a stationary magnet 42, positioned with its pole pieces in registration with the ends of the coil when the coil is in a neutral position of rotation. The coil generates a magnetic field in response to the sawtooth current of sawtooth generator 68, shown in FIG. 1. The coil and the mirror 32 are rotationally positioned by the action of the magnetic fields of the coil and the permanent magnet which tends to rotate the coil and mirror against the restraining force of the torsion suspension. The coil and mirror are held in a position of equilibrium for which the magnetic torque is equal and opposite to the spring torque. Accordingly, in response to the excitation of the drive coil by the sawtooth current generator 68, the coil and mirror 32 undergo an oscillatory rotation in which the angle of rotation or mirror 32 varies substantially in the manner of a sawtooth waveform composed of a succession of ramp waveforms with a rapid retrace from the end of each ramp to the start of the next ramp. For example, a high frequency response of 2 kilohertz is desirable for a 100 hertz sawtooth waveform. The rotational inertia of the coil, torsion suspension and mirror is sufficiently small to permit a fast retrace with high scanning efficiency which is frequently defined as the ratio of the time during which useful scanning is accomplished to the total time.

The image of object 24 which has been dissected by the scanning drum 20, galvanometer mirror 32, and detector 33 is reconstituted into a visible image by a raster scan which is conveniently displayed in the case of two detectors 33 on a well-known dual beam oscilloscope 72 having a dual beam cathode-ray tube, not shown. The electrical signals generated by detectors 33A and 33B in response to the intensity of the detected radiation are transmitted by means of conductors indicated diagrammatically by lines 74 and are displayed on oscilloscope 72 by applying each signal respectively to the beam modulation electrode of each beam of the cathode-ray tube. A well-known horizontal deflection signal having a generally sawtooth waveform for sweeping each electron beam of the cathode-ray tube simultaneously across the face of oscilloscope 72 is generated by a well-known deflection waveform generator 76 and is synchronized to the rotation of the drum 20 by means of the electrical trigger pulses from scan line photocell 66 to provide a horizontal sweep which is adjusted to the period of scanning by each drum mirror 22. Deflection waveform generator 76 also generates once for each frame of the raster scan two well-known vertical deflection signals for controlling respectively the vertical deflections of each of the two electron beams in the cathode-ray tube of oscilloscope 72. Each vertical deflection signal has a generally staircase waveform in which the horizontal portion of each step corresponds respectively to the duration of the scanning period of each drum mirror 22 and the vertical portion of each step corresponds respectively to the spacing between successive bars, or horizontal strips, of object 24 as set by the angle of tilt of each drum mirror 22. These deflection signals are synchronized to the rotation of the drum 20 by means of a single-frame reflector 78 on drum 20 which reflects a pulse of light from lamp 64 to frame photocell 80 which then transmits a corresponding triggering pulse to deflection waveform generator 76 to trigger the circuitry, not shown, for generating each staircase waveform. A well-known fixed bias is applied in conjunction with the staircase deflection signal to vertical deflection electrodes of one electron beam of the oscilloscope so that the beam deflection is offset vertically by one-half step of the staircase waveform relative to the deflection of the other beam to correspond with the vertical displacement between the two radiation detectors 33A and 33B. Thus, as each individual drum mirror 22 scans a horizontal strip of the image of object 24, the horizontal strip is subdivided into a set of two narrow, nonoverlapping line scans, as provided by the two radiation detectors 33A and 33B, to give a total number of line scans equal to the product of the number of drum mirrors 22 multiplied by the number of radiation detectors 33. For example, 10 drum mirrors and two detectors provide a total of 20 horizontal lines in the raster scan displayed on the oscilloscope.

Referring specifically to FIG. 2, there is shown a detailed sectional view of the optical system taken along the axis of the scanning drum 20 and showing in particular the angles of tilt of two drum mirrors 22, the angles being designated $\alpha_A$ and $\alpha_B$. The angles $\alpha_A$ and $\alpha_B$ which are formed by the intersections respectively of drum mirrors 22A and 22B with the inner surface of the drum, or alternatively by the intersection of an extension of the drum mirrors with the drum axis, lie in a plane which contains the drum axis and which perpendicularly bisects a drum mirror such as the drum mirror 22A or 22B.

Figure 3:
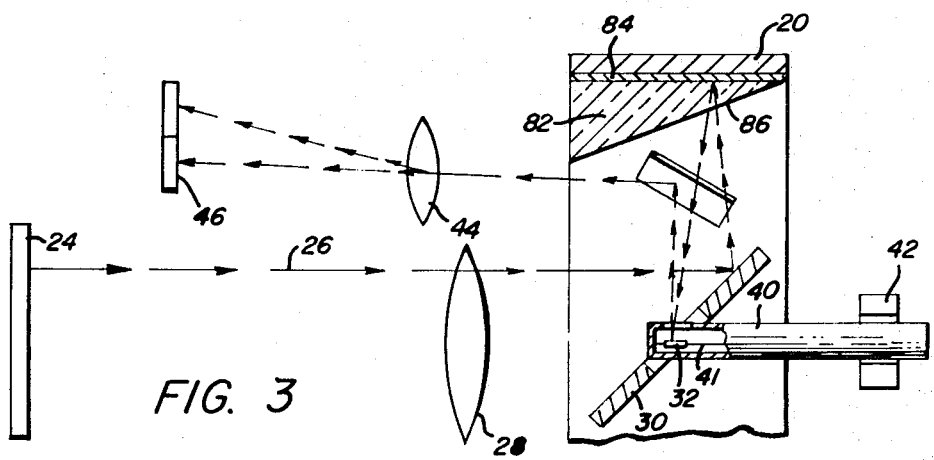
FIG. 3 is a sectional view of a scanning drum of an alternative embodiment of the invention in which prisms are utilized in the optical scanning drum.

Referring now to FIG. 3, there is shown an alternative embodiment of the invention which is illustrated by means of a partial sectional view taken along the axis of the scanning drum of this embodiment in which the tilted drum mirrors 22 of FIG. 1 are replaced in FIG. 3 with triangular prisms 82 mounted on drum 20. One surface of each drum prism 82 is coated with a metal, such as silver, to form a reflecting surface 84. Each drum prism 82 is affixed to the inner surface of the drum 20 so that the reflecting surfaces 84 are flush with the inner surface of drum 20. A second surface 86 of each drum prism 82 is inclined at an angle of inclination with respect to the reflecting surface 84 to deflect or bend the incident radiation from the inclined mirror 30. The inclination angle of any one drum prism 82 differs from the corresponding angles of the other drum prisms 82 so that each drum prism 82 scans a different line or strip of object 24. It is shown in FIG. 3 that an incident ray of light from inclined mirror 30 is refracted at the inclined surface 86, reflected from surface 84 and again refracted at inclined surface 86 as it exits from the prism 82 and is directed to galvanometer mirror 32. The angle between the exit and incident beams determines which line or strip of object 24 is to be scanned.

Figure 4:
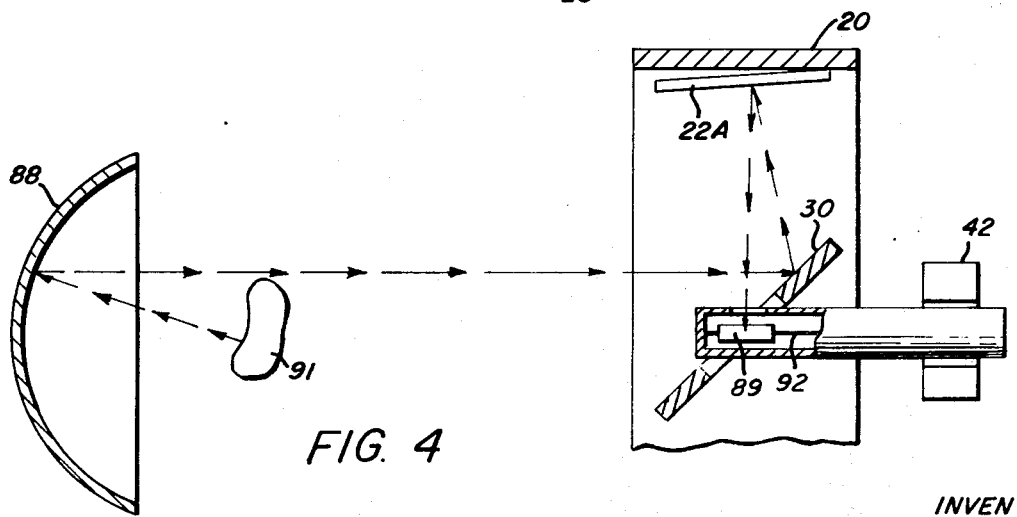
FIG. 4 is a sectional view of a scanning drum of an alternative embodiment of the invention in which a radiation detector is rotatably mounted approximately in the center of the scanning drum.

Referring now to FIG. 4, there is shown another embodiment of the invention which is formed by modifying the embodiment of FIG. 1, and is illustrated by means of a partial sectional view taken along the axis of the scanning drum of this embodiment. The converging lens 28 of FIG. 1 is replaced with a conic section mirror 88, operating as a primary focusing means, as shown in FIG. 4, such that an object 91, smaller than mirror 88, is located between the mirror 88 and the scanning drum 20 at a position near the focal point of the mirror 88 which focuses the rays of radiation in substantially the same fashion as lens 28. The galvanometer mirror 32 of FIG. 1 and the relay system comprising relay mirror 36, relay lens 44 and detector 33 of FIG. 1 are deleted and radiation receiving means in the form of a single radiation detector 89 is affixed to the galvanometer torsion support 92, to receive radiation reflected from a tilted drum mirror such as mirror 22A. The output signal from radiation detector 89 is applied to a well-known, single-beam oscilloscope, not shown, to modulate the electron beam of the oscilloscope in the same manner as that utilized for either one of the two beams in the embodiment of FIG. 1 for a video picture of object 91. The embodiment of FIG. 4 is advantageous because of the greater simplicity afforded by the use of fewer components than is utilized in the embodiment of FIG. 1. However, the embodiment of FIG. 1 has the advantage of greater scanning speed because of the utilization of a plurality of radiation detectors, and also because the galvanometer mirror 32 typically has a lower inertia than radiation detector 89 thereby facilitating a rapid oscillatory rotation of galvanometer mirror 32.

Referring now to FIG. 5, there is shown an isometric view of an alternative embodiment of the invention in which a multiplicity of radiation detectors 33, four of which are shown in FIG. 5, are vertically displaced from each other with reference to the horizontal line scans and are utilized instead of the two radiation detectors 33 shown in FIG. 1. As is seen by a comparison of the embodiments of FIGS. 5 and 1, both embodiments utilize the same scanning drum 20, with tilted mirrors 22, the same reflectors 60 and 78, and photocells 66 and 80, respectively, for synchronization, and the same lenses and mirrors which project portions of the image of object 24 to each respectively of the four radiation detectors 33. The displaying of the signals from the four radiation detectors 33 of FIG. 5 differs from that shown in FIG. 4 in which only one detector is used since the signals from the four detectors 33 of FIG. 5 are first combined in a manner that provides for the display of these signals by means of a single-beam oscilloscope 94.

The manner of combining the signals from the four detectors 33 for display on the single-beam oscilloscope 94 is best described by a discussion of these four signals. It is seen by a comparison of the embodiment of FIG. 5 with those of FIGS. 4 and 1 that in FIG. 4 the single-radiation detector 89 is continuously responsive to the image-forming rays of radiation during the complete period of scanning by each drum mirror such as the drum mirror 22A, while in FIG. 1 each of the two detectors 33 is continuously responsive to the radiation from only one-half of the image-forming rays of radiation from the galvanometer mirror 32 corresponding to two separate elements of object 24. In FIG. 5 each of the four detectors 33 is continuously responsive during the complete period of scanning by each drum mirror, such as the drum mirror 22A to the image-forming rays of radiation coming from four contiguous subelements which, as shown, pass through relay lens 44. It is therefore evident that by using a large number of detectors, for example 20, each portion or strip of the image scanned by an individual drum mirror is effectively subdivided into a large number, 20 in this example, of very fine, nonoverlapping, parallel strips or line scans. A raster scan display utilizing these fine line scans provides a high resolution video picture of object 24; for example, a scanning drum having 10 mirrors provides 10 coarse strips of the image, each of which is subdivided into 20 fine line scans to give a total number of 200 line scans per raster frame.

It is desirable to modify the four detector signals of FIG. 5 in a fashion that permits their display in essentially a simultaneous manner on the oscilloscope 94 which has only one electron beam in its cathode-ray tube, not shown, and can therefore display only one of the fine line scans at a time. Accordingly, the electrical signals generated by each of the detectors 33 in response to the intensity of detected radiation are fed by electrical conductors 95 to a well-known sampling unit 96 which sequentially samples and combines, in a well-known manner, the electrical signals of each of the detectors 33 to generate a single-channel video signal which is transmitted on electrical conductor 98 to the beam modulation electrode of the cathode-ray tube of oscilloscope 94. In essence, the sampling unit 96 is a well-known electronic gating or stepping switch which operates by switching rapidly from the signal of one detector to the signal of another detector and thereby sequentially provides an electrical conducting path from each of the detectors 33 to the oscilloscope 94.

The sequential switching is performed in a repetitive pattern in which the portion of the image viewed by the first of the detectors 33 is sampled again at the conclusion of the sampling of the signal of the fourth of the detectors 33. The repetition period of the sampling sequence has preferably a duration which is related to the movement of the image of object 24 projected upon detectors 33 by relay lens 44. The movement of the image across each of the detectors 33 is provided by the motion of the mirrors 22 on the rotating drum 20. The duration of the sampling repetition period is chosen preferably such that during this period the image has moved a distance of less than one detector width or resolution element, since a longer period would permit the image to move more than a resolution element leaving a part of the image unsampled until subsequent revolutions of the drum 20 when that part of the image would be sampled.

A shorter period would permit overlapping coverage of a single resolution element providing a more precise display of the image as for example if the sampling sequence is repeated two or three times during the scanning of a single resolution element. This process is repeated as the complete image is scanned horizontally so that, for example, if the sampling sequence of the four detector signals is repeated twice per resolution element, and there is a total of 200 resolution elements in a horizontal scan by a single-drum mirror 22, then the sampling sequence is repeated 400 times during the scanning by a single-drum mirror 22 giving a total number of samples for the four detectors of 1,600 samples during the scanning period of a single-drum mirror 22.

In order to position the displays of each of the aforementioned signal samples at their respective locations on the face of the oscilloscope 94 in FIG. 5, horizontal and vertical deflection signals are provided to position the electron beam in the cathode-ray tube of the oscilloscope 94. The horizontal deflection signal has the same generally sawtooth waveform as those described earlier in the descriptions of the embodiments of FIGS. 1 and 4, and is utilized to sweep the electron beam across the face of oscilloscope 94. The horizontal deflection signal is generated by deflection waveform generator 76 in the same manner as described earlier in the embodiment of FIG. 1 and is synchronized to the rotation of the drum 20 by means of the electrical pulses from scan line photocell 66 whereby a horizontal sweep is provided during the scanning period of each drum mirror 22.

The vertical deflection signal positions the electron beam vertically at the start of the scanning period of each drum mirror 22 so that the vertical position of the electron beam corresponds to the portion of the image of object 24 that is scanned by a particular drum mirror 22. Furthermore, the vertical deflection signal provides a succession of relatively small deviations in the vertical position of the electron beam which occur respectively at the start of each sampling interval in the aforementioned sampling sequences of the radiation detectors 33 and have amplitudes corresponding respectively to each of the spacings between the four fine line scans of the four radiation detectors 33. Accordingly, as the drum mirrors 22 scan successive portions of the image, the vertical deflection signal is incremented stepwise, as shown in graph B of FIG. 6, to display the successive portions of the image. Furthermore, as the sampling unit 96 samples each of the four detectors 33 successively in a repetitive sequence, the vertical deflection signal is incremented successively in a repeating sequence of four increments or steps, as shown in graph A of FIG. 6, to display corresponding signal samples from the four detectors 33. The complete vertical deflection signal is given by the sum of the fine staircase waveform of graph A in FIG. 6 and the coarse staircase waveform of graph B IN FIG. 6 as is shown by the vertical deflection signal of graph C in FIG. 6. In graph C there is also indicated the scanning period of each drum mirror 22 and the portion of the scanning cycle during which the galvanometer mirror retrace is effected. The graphs of FIG. 6 show, by way of example, a relationship between the fine and coarse staircase waveforms in which the fine staircase is repeating five times per scanning period of each drum mirror 22 plus one repetition during each retrace time of the galvanometer mirror 32. A uniform display of the detector signal samples is provided throughout the raster scan pattern whether or not the fine staircase waveform and the coarse staircase waveform occur in the synchronous relationship indicated in FIG. 6.

The fine and coarse staircase waveforms are generated respectively by a well-known sampling staircase generator 100 and the deflection waveform generator 76, and are summed together by a well-known summing network 102 to produce the vertical deflection signal of graph C in FIG. 6 which is then applied to the oscilloscope 94 in FIG. 5. Each staircase sequence of the fine staircase waveform is synchronized to the signal samples of the detectors 33 by means of a succession of well-known synchronizing pulses from the sampling unit 96 to the sampling staircase generator 100. The coarse staircase waveform shown in graph B is generated once for each frame of the raster scan and is synchronized to the rotation of drum 20 by the single frame reflector 78 on drum 20 which reflects a pulse of light from lamp 64 to frame photocell 80 which then transmits a corresponding electrical triggering pulse to the deflection waveform generator 76 to synchronize the circuitry, not shown, for generating the coarse staircase waveform.

Referring now to FIGS. 7 and 8, there is shown a further embodiment of the invention in which the vertical spacing between the horizontal line scans are provided by a rotating objective lens 104 having prismatic elements 106A and 106B, shown in detail in FIG. 8, for imparting a vertical deflection to the rays of light radiated from object 24. In this embodiment, drum mirrors 108, which are uniformly arranged along the inner surface of drum 20 with their central axes intersecting at a common point on the drum axis, replace the tilted drum mirrors 22 of FIGS. 1 and 5 which are no longer required because of the vertical deflection provided by lens 104.

Lens 104, as shown in a sectional view along the lens axis in FIG. 8, is composed of four optical elements, namely the two prismatic elements 106A and 106B which are placed between and in contact respectively with well-known planoconvex lens 110A and 110B which focus the radiation from object 24 to image at galvanometer mirror 32. Optical elements 106A and 110A are held by metallic ring 112A having a bevelled outer edge in the form of a bevelled gear 114A which meshes with drive pinion 116. Similarly, the optical elements 106B and 110B are held by metallic ring 112B coaxial with ring 112A and having a bevelled outer edge in the form of a bevelled gear 114B which also is meshed to pinion 116 so that the two rings 112A and 112B are driven by pinion 116 in counterrotation. The prisms 106A and 106B are symmetrically arranged with reference to a vertical plane containing the axis 115 of the lens 104 so that as the prisms 106A and 106B rotate about this axis, their respective base faces 118A and 118B are equidistant from this vertical plane. Thus, when the two prism bases 118A and 118B are at the bottom of lens 104, the rays of light focused by lens elements 110A and 110B are deflected downwards, and when the two bases 118A and 118B are at the top of lens 104 the rays of light are deflected upwards. The prismatic strengths of the prisms 106A and 106B are equal so that at intermediary positions of the bases 118A and 118B, that is, when the bases are part way between the aforesaid top and bottom positions, the horizontal deflection component provided by prism 106A is cancelled by the oppositely deflected horizontal component provided by prism 106B, leaving the desired deflection of the rays passing through lens 104 at an intermediate angle in the vertical plane only. The prismatic strengths are chosen so that the vertical deflection of the rays of light is sufficient to sweep the image-forming rays of object 24 across the drum mirrors 108 so that successive horizontal line scans provided sequentially by each of the drum mirrors 108 are vertically displaced from each other in accordance with the vertical deflection provided by lens 104.

In operation, therefore, the optical elements of lens 104 focus radiation from object 24 upon the galvanometer mirror 32 by means of inclined mirror 30 and drum mirrors 108. The optical elements of lens 104 are rotated by pinion 116 and lens controller unit 120, to be described below, to continuously sweep the image-forming rays of radiation past the drum mirrors 108, so that as the scanning drum is rotated by motor 58, each drum mirror 108 reflects a separate horizontal strip of the image of object 24 to focus upon galvanometer mirror 32. As in the embodiments of FIGS. 1 and 5, the galvanometer mirror 32 of this embodiment is cyclically rotated in response to the sawtooth current from generator 68, which is, in turn, synchronized with the rotating drum 20 by means of the scan line reflectors 60. The galvanometer mirror 32 thereby rotates in synchronism with the rotation of the drum mirrors 108 to further reflect the image-forming rays from object 24 to relay mirror 36 and relay lens 44 to focus upon radiation detectors 33A and 33B. The output signals of detectors 33A and 33B are displayed on dual beam oscilloscope 72 as in the embodiment of FIG. 1. A horizontal deflection signal, as is used in the embodiment of FIG. 1, for sweeping each electron beam across the face of oscilloscope 72 is generated by a well-known deflection waveform generator 121 which is synchronized to the drum rotation by means of electrical pulses from scan line photocell 66. The vertical deflection signal for oscilloscope 72 is generated by the lens controller 120 in a manner to be described.

The lens controller unit 120, shown in FIG. 7 and in schematic form in FIG. 8, provides a vertical deflection signal to the oscilloscope 72 corresponding with the vertical deflection of the image of object 24 provided by lens 104. In addition, the lens controller 120 imparts a nonlinear rotation rate to lens 104 through pinion 116 to compensate for the well-known nonlinear sinusoidal deflection rate which is provided by a prism, such as prism 106A and 106B, rotating at a constant rate of rotation. Accordingly, the lens rotation rate, as provided by controller 120, is increased at the larger deflection angles and decreased at the smaller deflection angles in a pattern which approximates a secant drive to provide a more linear, vertical deflection rate of rays passing lens 104 than would be the case if the prisms 106A and 106B rotated at a constant rate.

A simple form of controller 120, shown within the dashed line in FIG. 8, consists of an eccentric drive, indicated generally by 122, through which a constant rotation rate, provided by electric drive motor 124, is converted into a nonlinear rotation rate which is then impressed by the eccentric drive 122 upon gear train 126 which, in turn, rotates pinion 116. Motor pinion 128 is directly connected to motor 124 and drives a belt 130 which is in contact with the periphery of eccentric 132, so that the rotation of motor 124 is imparted via pulley 128 and belt 130 to eccentric 132. Idler pulley 134 is pressed against belt 130 by a spring, not shown, to take up slack in belt 130 as eccentric 132 rotates about eccentric axis 136 which is offset from the center 138 of the eccentric. As is well known, the velocity of the periphery of eccentric 132 is constant when the belt slack is taken up by the idler 134, while the angular velocity of gear 140, centered on eccentric axis 136 and directly connected to eccentric 132, varies periodically from slow to relatively fast with each revolution of the eccentric. Gear 140 drives gear 146 which, in turn, is directly connected to pinion 116 to impart rotation to lens 104.

The rings 112A and 112B are supported by a rigid structure such as housing 142, partially shown in FIG. 7, having rollers 144 mounted in a well-known manner to guide and support the rings. Additional well-known rigid support structures, not shown, are provided for pinion 116 and the components of controller 120.

In order to impart the aforesaid periodic variations in angular velocity, or rotation rate, to lens 104, the diameters, respectively, of gear 140 and gear 146 have a ratio equal to one-half the ratio of the diameters, respectively, of either gear 114A or 114B to pinion 116 so that two revolutions of gear 140 produce one revolution each of gears 114A and 114B. The eccentric 132 is aligned relative to gears 114A and 114B so that a maximum angular velocity is produced when the prism bases 118A and 118B are at the top of lens 104. Since gear 140 and eccentric 132 rotate twice for each revolution of the elements of lens 104, a maximum angular velocity of the elements of lens 104 is also produced when the prism bases 118A and 118B are at the bottom of lens 104. Thereby the desired nonlinearity is imparted to the lens rotation rate by controller 120 such that the rate is increased at the larger deflection angles and decreased at the smaller deflection angles in a pattern which sufficiently approximates a secant drive to compensate for the nonlinearity of the sinusoidal prism scan to give a more uniform spacing between the horizontal strips of the raster scan displayed on oscilloscope 72.

The vertical deflection signal for oscilloscope 72 is obtained by means of a well-known synchro 148, shown in FIG. 8, directly connected to gear 150 which is driven by gear 146. The ratio of the diameters respectively of gears 150 and 146 is the same as the ratio of the diameters respectively of the gears 114A and 114B to pinion 116 so that the synchro rotor, not shown, makes one rotation for each rotation of the elements of lens 104. In addition, the synchro rotor is aligned with gears 114A and 114B to provide a maximum deflection voltage in synchronism with the maximum deflection of the rays of light by prisms 106A and 106B. A well-known synchronous detector 152, energized by the same source of alternating electric current utilized for synchro 148, converts the synchro output into a positive and negative voltage signal which is fed by way of conductor 154 to deflect vertically the beam of oscilloscope 72. This deflection signal corresponds to the positive and negative vertical deflection of the optical rays, such as the visible or infrared rays emitted by object 24, provided by the prismatic elements 106A and 106B of lens 104.

It is understood that the above-described embodiments of the invention are illustrative only, and that modifications thereof will occur to those skilled in the art. Accordingly, it is desired that the invention is not to be limited to the embodiments disclosed herein but is to be limited only as defined by the appended claims.

We claim:

1. An optical scanning system comprising a rotatable drum having a series of independent reflecting means located around its circumference, focusing means having an optical axis coaxial with said drum for directing image-forming rays of radiation onto said reflecting means from a source of radiation, rotatable radiation detection means positioned on the axis of said drum to receive image-forming rays of radiation which are reflected from said reflecting means, at least one of said reflecting means being adapted to reflect radiation at a different angle than the other reflecting means toward said detection means whereby as the drum rotates each of said reflecting means together with said detection means performs a line scan of said image-forming rays, and synchronizing means for synchronizing the rotation of said detection means with the rotation of said reflecting means through an angle sufficient to permit sequential detection of radiation during an individual line scan.

2. An optical scanning system comprising a rotatable drum having a series of independent reflecting means located around its circumference, focusing means having an optical axis coaxial with said drum for directing image-forming rays of radiation onto said reflecting means from a source of radiation, radiation detection means including a rotatable means positioned to receive image-forming rays of radiation which are reflected from said reflecting means, at least one of said reflecting means being adapted to reflect radiation at a different angle than the other reflecting means toward said detection means whereby as the drum rotates each of said reflecting means together with said detection means performs a line scan of said image-forming rays, synchronizing means for synchronizing the rotation of said rotatable means with the rotation of said reflecting means through an angle sufficient to permit sequential detection of radiation during an individual line scan, each of said reflecting means being a reflecting surface, each of said reflecting means being tilted at successively different angles with respect to the axis of said drum whereby as the drum rotates each of said reflecting means performs a different line scan.

3. An optical scanning system comprising a rotatable drum having a series of independent reflecting means located around its circumference, focusing means having an optical axis coaxial with said drum for directing image-forming rays of radiation onto said reflecting means from a source of radiation, radiation detection means including a rotatable means positioned to receive image-forming rays of radiation which are reflected from said reflecting means, at least one of said reflecting means being adapted to reflect radiation at a different angle than the other reflecting means toward said detection means whereby as the drum rotates each of said reflecting means together with said detection means performs a line scan of said image-forming rays, synchronizing means for synchronizing the rotation of said rotatable means with the rotation of said reflecting means through an angle sufficient to permit sequential detection of radiation during an individual line scan, each of said reflecting means comprising a reflecting surface and a prism, a first side of said prism being in spaced relation to said reflecting surface and a second side of said prism being angularly disposed with reference to said first side, the prisms in each of said reflecting means having first and second sides disposed with successively different angularities whereby image-forming rays of radiation are refracted at successively different angles to reflect from the reflecting surface in each of said reflecting means at successively different angles as said drum rotates.

4. An optical scanning system comprising a rotatable drum having a series of independent reflecting means located around its circumference, focusing means having an optical axis coaxial with said drum for directing image-forming rays of radiation onto said reflecting means from a source of radiation, radiation detection means positioned to receive image-forming rays of radiation which are reflected from said reflecting means, at least one of said reflecting means being adapted to reflect radiation at a different angle than the other reflecting means toward said detection means whereby as the drum rotates each of said reflecting means together with said detection means performs a line scan of said image-forming rays, said radiation detection means including a rotatable mirror, relay focusing system, and a plurality of radiation detectors, and synchronizing means for synchronizing the rotation of said rotatable mirror with the rotation of said reflecting means through an angle sufficient to permit sequential detection of radiation during an individual line scan, the rotatable mirror being located approximately on the axis of the drum and the relay focusing system and being positioned relative to the rotatable mirror whereby the image-forming rays of radiation from said reflecting means are incident upon the rotatable mirror and reflected by the rotatable mirror through the relay focusing system to be detected by the radiation detectors.

5. An optical scanning system providing both horizontal and vertical scan of an object comprising a rotatable drum having a series of independent reflecting means located around its circumference, focusing means for directing image-forming rays of radiation from said object sequentially on to each of said reflecting means, radiation detection means including rotatable means positioned to receive image-forming rays of radiation which are reflected from said reflecting means, selection means for progressively directing portions of the image produced by said focusing means to said radiation detection means, and synchronizing means for synchronizing the rotation of said rotatable means with the rotation of said reflecting means through an angle sufficiently large to permit successive detection of radiation of all points along an individual line scan.

6. The apparatus of claim 5 including means for displaying a raster scan of said image.

7. The apparatus of claim 2 including means for displaying a raster scan of the image produced by said focusing means.

8. The apparatus of claim 5 in which said selection means is combined with said focusing means and includes a compound focusing lens having prismatic portions in which a pair of prisms rotate in opposite directions about their common optical axis with the same rate of rotation to refract image-forming rays of radiation from said object over a continuously varying angle of refraction, each of said prisms having substantially identical physical forms and being positioned in symmetrical spaced relation whereby the horizontal components of the optical refraction produced by each prism are made to cancel, and the vertical components of the optical refraction produced by each prism combine to provide vertical scan.

9. The apparatus of claim 8 including means for displaying a raster scan of the image formed by said focusing means.

10. The apparatus of claim 9 including means for rotating said prisms and means for synchronizing said angle of refraction with the display of said raster scan.

11. A device for scanning approximately linearly across an object emitting radiation comprising in combination and in optical alignment: primary focusing means which forms an image of said object, first reflecting means, a rotatable drum-shaped housing supporting along its inner surface a plurality of second reflecting means which are in spaced relationship, each of the second reflecting means having an orientation relative to the drum-shaped housing whereby each of the second reflecting means scans a separate portion of said object as the drum-shaped housing rotates, radiation receiving means, the primary focusing means and the first reflecting means and the radiation receiving means being so positioned and oriented relative to the drum-shaped housing whereby the radiation transmitted through the primary focusing means is reflected by the first reflecting means to reflect sequentially upon each of the second reflecting means and to image upon the radiation receiving means as the drum-shaped housing rotates, the radiation receiving means being rotatably supported about an axis of rotation which is oriented relative to the axis of the drum-shaped housing whereby the radiation reflected from each of the second reflecting means is sequentially incident approximately normally upon the receiving aperture of the radiation receiving means, and means to rotate the radiation receiving means in synchronism with the rotation of the drum-shaped housing.

12. A device for scanning approximately linearly across an object emitting radiation comprising in combination and in optical alignment: primary focusing means which forms an image of said object, first reflecting means, a rotatable drum-shaped housing supporting along its inner surface a plurality of second reflecting means which are in spaced relationship, each of the second reflecting means having an orientation relative to the drum-shaped housing whereby each of the second reflecting means scans a separate portion of said object as the drum-shaped housing rotates, third reflecting means, the primary focusing means and the first reflecting means and the third reflecting means being so positioned and oriented relative to the drum-shaped housing whereby the radiation transmitted through the primary focusing means is reflected by the first reflecting means to reflect sequentially upon each of the second reflecting means and image upon the third reflecting means as the drum-shaped housing rotates, radiation receiving means, the third reflecting means being rotatable about an axis of rotation which is oriented relative to the axis of the drum-shaped housing whereby the radiations reflected from each of the second reflecting means and incident upon the third reflecting means can be reflected by the third reflecting means to the radiation receiving means, and means to rotate the third reflecting means in synchronism with the rotation of the drum-shaped housing.

13. The apparatus as defined in claim 12 including a relay lens and mirror system to transmit the radiation from the third reflecting means to the radiation receiving means.

14. The apparatus as defined in claim 12 in which the first and third reflecting means are adapted whereby the third reflecting means can be located approximately at the center of the first reflecting means.

15. The apparatus as defined in claim 13 in which the third reflecting means is positioned on the optical axis of the primary focusing means to provide a more linear scan pattern.

16. The apparatus of claim 15 including means for displaying a raster scan of the image formed by the primary focusing means.

17. An optical scanning system providing vertically displaced horizontal line scans of an object comprising a series of reflecting means positioned about an axis with their reflecting surfaces facing said axis, focusing means for directing image-forming rays of radiation emitted by said object to form an image of said object upon an image surface spaced apart from said focusing means, a movable support structure for sequentially carrying each of said reflecting means between said focusing means and said image surface to reflect portions of said image-forming rays to continuously provide an image at a common point on said axis, detection means positioned on said axis to detect the radiation emitted by said object, each of said reflecting means having an orientation relative to said movable support structure whereby each of said reflecting means scans a different portion of said object, said reflecting means being angled relative to each other such that each of said reflecting means together with said detection means provides a different one of said horizontal line scans.

18. An optical scanning system providing vertically displaced horizontal line scans of an object comprising a series of reflecting means, focusing means for directing image-forming rays of radiation emitted by said object to form an image of said object upon an image surface spaced apart from said focusing means, a movable support structure for sequentially carrying each of said reflecting means between said focusing means and said image surface to reflect portions of said image forming rays to continuously provide an image at a common point, an oscillating reflector moving in synchronism with the motion of each of said reflecting means and positioned at said common point to further reflect the radiation emitted by said object, detection means including at least one radiation detector located at a fixed point away from said common point for receiving rays of radiation from said oscillating reflector, said reflecting means being angled relative to each other such that each of said reflecting means together with said oscillating reflector and said detection means provides a different one of said horizontal line scans.

* * * * *